Figure 1:
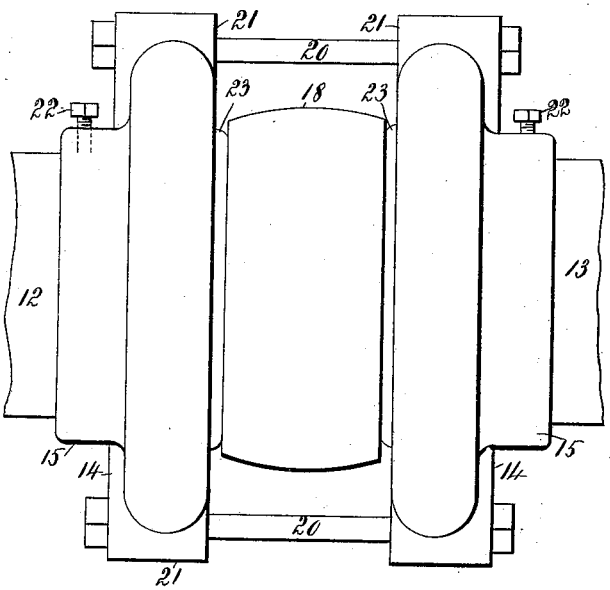

No. 618,587. Patented Jan. 31, 1899.
N. SIMMONS.
COUPLING FOR PIPES.
(Application filed Mar. 22, 1897.)

(No Model.)

WITNESSES
John Ruckles,
F. M. Fosler

INVENTOR
Nimrod Simmons
BY
Edgar Tate & Co.
ATTORNEYS

THE NORRIS PETERS CO., PHOTO-LITHO., WASHINGTON, D. C.

United States Patent Office.

NIMROD SIMMONS, OF BRISTOL, ENGLAND.

COUPLING FOR PIPES.

SPECIFICATION forming part of Letters Patent No. 618,587, dated January 31, 1899.

Application filed March 22, 1897. Serial No. 628,667. (No model.)

*To all whom it may concern:*

Be it known that I, NIMROD SIMMONS, a subject of the Queen of Great Britain, residing at Bristol, in the county of Bristol, England, have invented certain new and useful Improvements in Couplers for Pipes, (for which I have obtained a patent in Great Britain, No. 7,355, bearing date April 13, 1894,) of which the following is a full and complete specification, such as will enable those skilled in the art to which it appertains to make and use the same.

This invention relates to pipe joints and couplings; and the object thereof is to provide improved devices of this class which are simple in construction and operation and by means of which detachable joints for water-pipes, steam-pipes, sanitary pipes, and other pipes of this class may be quickly and easily formed.

In the drawings forming part of this specification the separate parts of my improvement are designated by numerals of reference throughout both views, and in said drawings—

Figure 2:
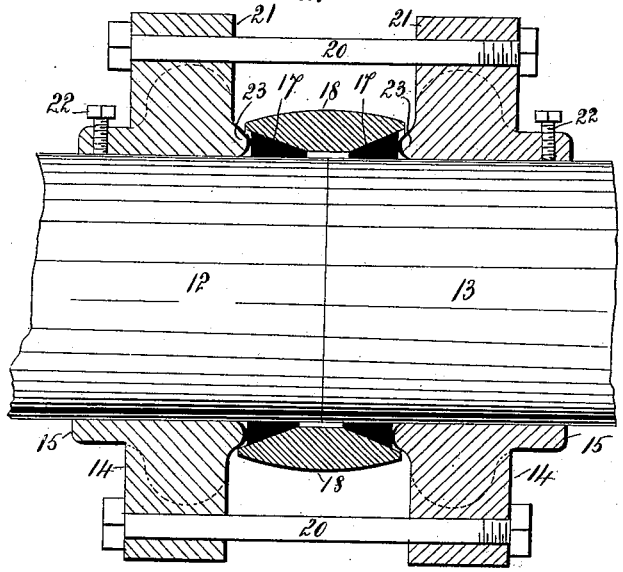

Figure 1 is a side view of my improved coupling, and Fig. 2 a central longitudinal section thereof.

In the drawings forming part of this specification the separate parts of my improvement are designated by the same numerals of reference in each of the views, and in said drawings I have shown at 12 and 13 two sections of pipe which are connected by means of my improved coupling, and in practice I provide a coupler which comprises two annular bands or rings 14, each of which is provided with an outwardly-directed flange or rim 15 around the central bore thereof, and said rings or bands are provided on their adjacent sides or surfaces each with an inwardly-directed annular flange or rim 23. I also provide a supplemental band or ring 18, which is preferably convex in cross-section on its outer surface and the inner walls of which are beveled at each side, so as to receive the inwardly-directed annular flanges or rims 23, and mounted on the adjacent ends of the tube-sections 12 and 13, within the beveled sides of the ring or band 18, are packing-rings 17, of any desired material, these packing-rings being preferably wedge-shaped in cross-section, so as to correspond with the shape of the spaces between the pipe-sections and the ring or band 18 in which they are placed.

The rings or bands 14 are provided with outwardly-directed shoulders or projections 21, through which are passed bolts 20, by which said rings or bands 14 are drawn together, said bolts being provided at one end with a head and at the opposite end with a screw-threaded nut for this purpose, and in the operation of drawing the rings or bands 14 together the packing-rings 17 are compressed and forced inwardly by the annular flanges or rims 23, and thus a perfectly secure and tight coupling is produced.

The outwardly-directed flanges or rims 15 on the rings or bands 14 are also preferably provided with set-screws 22, which are passed therethrough and bear on the pipe-sections 12 and 13 and serve to more securely hold said rings or bands 14 in connection with said pipe-sections.

My improved coupling is simple in construction and operation and perfectly adapted to accomplish the result for which it is intended and is also comparatively inexpensive.

Having fully described my invention, I claim as new and desire to secure by Letters Patent—

The herein-described coupling for pipes which consists of two rings or bands, the adjacent sides of which are provided with inwardly-directed annular flanges or rims, a supplemental band which is adapted to be placed between said rings or bands, and the inner edges of which are beveled, two rings or bands of compressible and expansible packing material which are placed between the pipe-sections to be coupled within the beveled portions of the supplemental band, and means for drawing the first-named rings or bands together so that the inwardly-directed annular flanges or rims thereon will compress said packing rings or bands, substantially as shown and described.

In testimony that I claim the foregoing as my invention I have signed my name, in presence of the subscribing witnesses, this 11th day of February, 1897.

NIMROD SIMMONS.

Witnesses:
JOHN ALFRED LEWIS,
THOMAS HENRY SIMMONS.